(12) United States Patent
Jeong et al.

(10) Patent No.: US 7,833,603 B2
(45) Date of Patent: Nov. 16, 2010

(54) OPTICAL DISC USING METHYLMETHACRYLATE-ACRYLONITRILE-BUTADIENE-STYRENE COPOLYMER RESIN

(75) Inventors: Bong Jae Jeong, Yeosu-si (KR); Doo Han Ha, Yeosu-si (KR)

(73) Assignee: Cheil Industries Inc., Gumi-si (KR)

( * ) Notice: Subject to any disclaimer, the term of this patent is extended or adjusted under 35 U.S.C. 154(b) by 749 days.

(21) Appl. No.: 11/685,861

(22) Filed: Mar. 14, 2007

(65) Prior Publication Data
US 2007/0224384 A1 Sep. 27, 2007

(30) Foreign Application Priority Data
Mar. 21, 2006 (KR) .................. 10-2006-0025828
May 25, 2006 (WO) .................. PCT/KR06/01977

(51) Int. Cl.
*B32B 3/02* (2006.01)
(52) U.S. Cl. .................. 428/64.1; 428/64.4; 430/270.11
(58) Field of Classification Search .................. None
See application file for complete search history.

(56) References Cited

U.S. PATENT DOCUMENTS

| 4,982,014 A | 1/1991 | Freitag et al. |
|---|---|---|
| 5,053,471 A | 10/1991 | Goto et al. |
| 5,126,428 A | 6/1992 | Freitag et al. |
| 5,164,469 A | 11/1992 | Goto et al. |
| 5,227,458 A | 7/1993 | Freitag et al. |
| 5,276,256 A | 1/1994 | Niessner et al. |
| 5,862,121 A * | 1/1999 | Suzuki .................. 369/275.1 |
| 6,380,303 B1 | 4/2002 | Ogoe et al. |
| 6,744,725 B2 * | 6/2004 | Kondo .................. 369/275.4 |
| 2001/0012257 A1 | 8/2001 | Suzuki et al. |

FOREIGN PATENT DOCUMENTS

| JP | 01-132625 A | | 5/1989 |
|---|---|---|---|
| JP | 05-239338 A | | 9/1993 |
| JP | 2003-242679 | * | 8/2003 |
| KR | 10-0148235 B1 | | 8/1998 |
| KR | 10-2001-0075534 A | | 8/2001 |
| KR | 10-2002-0089361 A | | 11/2002 |
| WO | 2007/108571 A1 | | 9/2007 |

OTHER PUBLICATIONS

International Search Report in counterpart International Application No. PCT/KR2006/001977, dated Nov. 29, 2006.

* cited by examiner

*Primary Examiner*—Elizabeth Mulvaney
(74) *Attorney, Agent, or Firm*—Summa, Additon & Ashe, P.A.

(57) ABSTRACT

An optical disc includes an active disc on which information is recorded and a dummy disc for protecting the active disc. The active disc and the dummy disc are bonded to form a single body, and the dummy disc is made of methylmethacrylate-acrylonitrile-butadiene-styrene copolymer (MABS) resin.

7 Claims, 1 Drawing Sheet

OPTICAL DISC USING METHYLMETHACRYLATE-ACRYLONITRILE-BUTADIENE-STYRENE COPOLYMER RESIN

CROSS REFERENCE TO RELATED PATENT APPLICATIONS

This non-provisional application claims priority from PCT Application No. PCT/KR2006/001977, filed May 25, 2006, which designates the U.S. and which is hereby incorporated by reference in its entirety, and from Korean Patent Application No. 10-2006-0025828, filed Mar. 21, 2006, which is also herein incorporated in its entirety by reference.

FIELD OF THE INVENTION

The present invention relates to an optical disc and more particularly to an optical disc having a double-layered structure including an active disc and a dummy disc.

BACKGROUND OF THE INVENTION

Optical discs such as compact discs have been widely used for recording and reproducing information. Compact discs can include a disc-shaped resin substrate made of polymethylmethacrylate resin or polycarbonate resin and an information recording layer having a pit on the surface of the disc-shaped resin substrate. A reflective layer and a protective layer may be sequentially formed on the surface of the information recording layer.

Compact discs can, however, have insufficient storage capacity. Accordingly, digital versified discs (DVDs) have been developed to increase storage capacity.

Generally, digital versified discs include two disc members including an active disc which records information and a dummy disc which protects the active disc. In contrast, a compact disc includes only a single disc.

The rotation speed for driving a DVD is about 10,000 rpm. Because the central core of the DVD is fixed during rotation and driving, the impact strength of the central core of DVD is very important. It can be especially important for the dummy disc, which protects an active disc, to exhibit crack resistance during driving or storage.

Polycarbonate or polymethylmethacrylate resins have been used as materials for the active disc. Polycarbonate resin has been conventionally used as the material for the dummy disc because of its good adhesion to an active disc, elongation, bending properties, and good impact resistance, which are all required properties for protecting an active disc.

However, polycarbonate resin is a relatively expensive resin, and thus its use can increase production costs of optical discs for DVDs. Further, because of its low flowability, polycarbonate resin requires high temperature and pressure during molding processes, which can decrease productivity.

If polymethylmethacrylate, SAN resin, or GPPS resin is used as a material for a dummy disc, although it is possible to form an optical disc by UV adhesion, these resins have reduced capability for protecting an active disc. As a result, problems such as a crack on the optical disc, may easily occur.

Furthermore, if ABS resin is used as a material for a dummy disc, although the dummy disc may have impact resistance, it may not be adhered by UV adhesion. Thus, an alternative method for adhesion other than UV adhesion may need to be adopted, which can result in addition processing steps.

Accordingly, the present inventors have developed an optical disc that has excellent flowability, strength, elongation and UV permeability as well as high productivity and may decrease production costs by employing a MABS resin as a dummy disc.

SUMMARY OF THE INVENTION

One aspect of the invention provides an optical disc comprising an active disc 1 on which information is recorded; and a dummy disc 4 for protecting the active disc. The active disc and the dummy disc are bonded to form a single body, and the dummy disc is made of methylmethacrylate-acrylonitrile-butadiene-styrene copolymer (MABS) resin. The inventors have found that MABS resin can replace polycarbonate resin conventionally used for a dummy disc. The resultant optical disc can exhibit excellent flowability, strength, elongation and UV permeability and also decreased production costs. The optical disc can also exhibit good crack resistance.

In exemplary embodiments, the methylmethacrylate-acrylonitrile-butadiene-styrene copolymer (MABS) resin can include a rubber component having an average particle size of about 100 to about 350 nm.

In exemplary embodiments, the methylmethacrylate-acrylonitrile-butadiene-styrene copolymer (MABS) resin can include a rubber component that is polybutadiene or butadiene-styrene copolymer rubber and the content of styrene in the MABS resin can range from about 0 to about 25% by weight.

In exemplary embodiments, the methylmethacrylate-acrylonitrile-butadiene-styrene copolymer (MABS) resin can include polybutadiene as a rubber component, and the MABS resin can include about 53 to about 64% by weight of methylmethacrylate, about 3 to about 5% by weight of acrylonitrile, about 10 to about 30% by weight of polybutadiene, and about 14 to about 19% by weight of styrene.

In exemplary embodiments, the methylmethacrylate-acrylonitrile-butadiene-styrene copolymer (MABS) resin can include butadiene-styrene copolymer rubber as a rubber component, and the MABS resin can include about 36 to about 47% by weight of methylmethacrylate, about 4 to about 7% by weight of acrylonitrile, about 10 to about 30% by weight of butadiene-styrene copolymer rubber, and about 30 to about 36% by weight of styrene.

In exemplary embodiments, the optical disc can further include a recording surface 2 and a reflective layer 3. The recording surface 2 is formed on the active disc 1, and the reflective layer 3 is deposited onto the recording surface 2. The dummy disc can be bonded to the reflective layer 3.

In exemplary embodiments, the dummy disc is bonded via an ultraviolet ray curing resin.

DETAILED DESCRIPTION OF THE INVENTION

Figure 1:
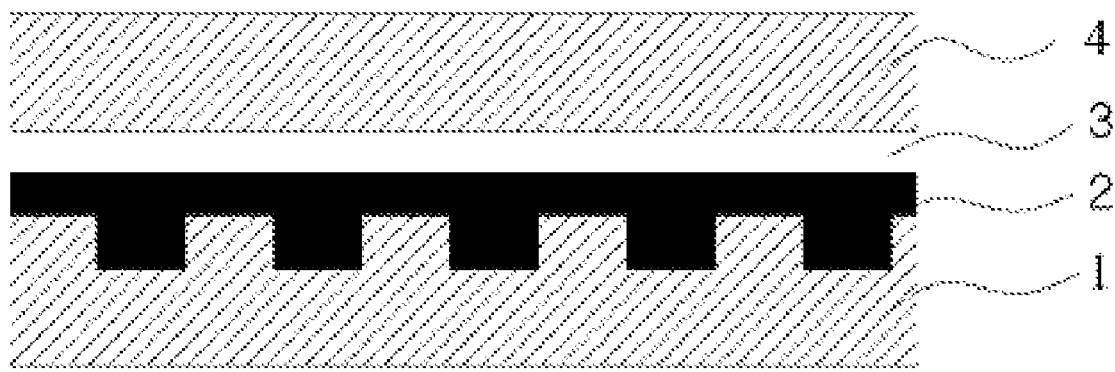
FIG. 1 is a schematic diagram showing a structure of a double-layered optical disc including an active disc and a dummy disc.

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

FIG. 1 is a cross sectional view schematically showing a configuration of a double-layered optical disc including an active disc and a dummy disc. The optical disc for a DVD includes two disc members including an active disc which records information and a dummy disc which protects the active disc. The active disc and the dummy disc have a thickness of about 0.6 mm respectively.

A light-transmissive material at a wavelength of 650 nm may be used for the active disc 1, for example, but not limited to, polymethylmethacrylate (PMMA), polycarbonate (PC), amorphous polyolefin, etc., and combinations thereof. A recording fluid may be applied onto either one side or both sides of the active disc to form a recording surface 2 on which a groove is formed. Methods for applying a recording fluid onto one or both surfaces of the active disc to form a recording surface 2, as well as methods for forming a groove thereon, suitable for use in the present invention are well known in the art and will be readily understood by the skilled artisan.

In one embodiment of the present invention, a reflective layer 3 is formed on the recording surface 2. The reflective layer may be formed by a method such as deposition or sputtering of a metal. Examples of suitable metals include without limitation aluminum, aluminum alloy, copper, copper alloy, etc., and combinations thereof. Methods for forming the reflective layer suitable for use in the present invention are well known in the art and will be readily understood by the skilled artisan.

In the present invention, methylmethacrylate-acrylonitrile-butadiene-styrene copolymer (MABS) resin is used as a material for dummy disc 4.

In one embodiment, the methylmethacrylate-acrylonitrile-butadiene-styrene copolymer (MABS) resin employs polybutadiene as a rubber component and the methylmethacrylate-acrylonitrile-butadiene-styrene copolymer (MABS) resin comprises about 53 to about 64% by weight of methylmethacrylate, about 3 to about 5% by weight of acrylonitrile, about 10 to about 30% by weight of polybutadiene, and about 14 to about 19% by weight of styrene.

In another embodiment, the methylmethacrylate-acrylonitrile-butadiene-styrene copolymer (MABS) resin employs butadiene-styrene copolymer rubber as a rubber component, and comprises about 36 to about 47% by weight of methylmethacrylate, about 4 to about 7% by weight of acrylonitrile, about 10 to about 30% by weight of butadiene-styrene copolymer rubber, and about 30 to about 36% by weight of styrene.

The MABS resin may be prepared by adding a monomer mixture comprising methylmethacrylate, acrylonitrile and styrene to a polybutadiene rubber latex or a butadiene-styrene copolymer rubber latex while adjusting the refractive index of the monomer mixture to be similar to that of rubber latex and graft polymerizing through conventional emulsion polymerization.

In some embodiments, the graft emulsion polymerization may be conducted by following two methods.

In one embodiment, the content of polybutadiene rubber latex or butadiene-styrene copolymer rubber latex is fixed to about 10 to about 30% by weight (based on solid content). A monomer mixture comprising methylmethacrylate, acrylonitrile and styrene is added to the rubber latex, adjusting the refractive index of the monomer mixture to be similar to that of rubber latex, followed by graft emulsion polymerization. The resultant product is coagulated, dehydrated and dried to obtain a fine graft methylmethacrylate-acrylonitrile-butadiene-styrene copolymer (MABS) powder. An antioxidant, a stabilizer and a lubricant can be added to 100 parts by weight of the graft MABS powder containing about 10 to about 30% by weight of rubber and extruded to obtain MABS in pellet form.

In another embodiment, the content of polybutadiene rubber latex or butadiene-styrene copolymer rubber latex is fixed to about 40 to about 60% by weight (based on solid content). A monomer mixture comprising methylmethacrylate, acrylonitrile and styrene is added to the rubber latex, adjusting the refractive index of the monomer mixture to be similar to that of rubber latex, followed by graft emulsion polymerization. The resultant product is coagulated, dehydrated and dried to obtain a fine graft methylmethacrylate-acrylonitrile-butadiene-styrene copolymer (MABS) powder. In a separate process, methylmethacrylate, acrylonitrile, and styrene are suspension- or bulk-polymerized to obtain a methylmethacrylate-acrylonitrile-styrene copolymer resin (MSAN) having the same refractive index as the graft MABS. An antioxidant, a lubricant, a stabilizer and other additives can be added to 100 parts by weight of a resin mixture including about 75 to about 17 parts by weight of the graft MABS powder and about 25 to about 83 parts by weight of the MSAN, and extruded to obtain MABS in pellet form. Note that the content of rubber, methylmethacrylate, acrylonitrile, and styrene in the pellet of the above embodiments may be the same.

The average particle size of the rubber in the methylmethacrylate-acrylonitrile-butadiene-styrene copolymer (MABS) can be about 100 to about 350 nm, for example, about 120 to about 250 nm. If the average rubber particle size is less than about 100 nm, the impact resistance of the dummy disc may decrease so that a crack may occur. On the other hand, if the average rubber particle size is more than about 350 nm, UV permeability of the dummy disc may deteriorate.

In general, when ABS resin is used as a material for a dummy disc, it may not be possible to be adhered by UV adhesion. This can have the disadvantage of requiring additional steps, which can decrease productivity and price competitiveness. The present invention may provide an optical disc having good UV adhesion property, impact resistance and bending property by employing a MABS resin as a dummy disc.

In one embodiment of the present invention, the dummy disc is bonded to the reflective layer 3 via an adhesive layer. An ultraviolet ray curing resin may be used as the adhesive layer. In one embodiment, the ultraviolet ray curing resin is applied between the dummy disc and the reflective layer, and subjected to irradiating ultraviolet rays to bond the dummy disc and the reflective layer to each other. Other methods of adhesion known to those skilled in the art may alternatively be employed.

The method for preparing an optical disc of the present invention is not particularly limited and methods known in the art can be used. For example, a resin for producing an active disc can be injected into an injection molding machine equipped with a plate having patterns to obtain an active disc. A composition for forming an information layer can be applied on the active disc to form grooves. A reflective layer can be formed on the foregoing surface of the information layer by depositing a metal such as aluminum. Then, a dummy disc on which an ultraviolet ray curable adhesive is applied can be bonded to the reflective layer to obtain a DVD optical disc.

The invention may be better understood by reference to the following examples which are intended for the purpose of illustration and are not to be construed as in any way limiting the scope of the present invention, which is defined in the claims appended hereto. In the following examples, all parts and percentage are by weight unless otherwise indicated.

Example 1

55% by weight (solid content) of polybutadiene latex having an average rubber particle size of 200 nm, 33.23% by weight of methylmethacrylate, 2.25% by weight of acrylonitrile, and 9.52% by weight of styrene are emulsion polymerized. The resultant product is coagulated, dehydrated and dried to obtain graft MABS powder having a water content of less than 1 wt %.

To a separate reactor, 73.85% by weight of methylmethacrylate, 5% by weight of acrylonitrile, and 21.15% by weight of styrene are added and suspension polymerized. The resultant product is dehydrated and dried to obtain methylmethacrylate-acrylonitrile-styrene copolymer resin (MSAN) with a weight average molecular weight of about 105,000 in bead form.

To 100 parts by weight of a resin mixture of 31% by weight of the graft MABS powder and 69% by weight of the MSAN thus produced respectively, 0.3 parts by weight of Irganox 1076 (Ciba) as an antioxidant, 0.2 parts by weight of ethylenebis stearamide as a lubricant, and 0.3 parts by weight of a magnesium stearate as a stabilizer are added and mixed. The mixture is extruded to prepare a product in pellet form. The resin pellets are molded into test specimens for measuring physical properties and a 0.6 mm thick dummy disc. The components present in the methacrylate-acrylonitrile-butadiene-styrene copolymer (MABS) resin are 61.3% by weight of methylmethacrylate, 4.2% by weight of acrylonitrile, 17% by weight of butadiene rubber, and 17.5% by weight of styrene.

A dummy disc for a DVD obtained from the above is bonded onto an active disc made of polycarbonate (product name: Makrolon CD2005 manufactured by Bayer AG) by applying an ultraviolet ray curable adhesive between the dummy disc and the active disc and irradiating ultraviolet rays to obtain an optical disc.

Example 2

Example 2 is prepared in the same manner as in Example 1 except that MABS resin having a polybutadiene latex with an average rubber particle size of 140 nm is used as a dummy disc and polymethylmethacrylate resin (product name: IF-850 manufactured by LG Chemical Co.) is used as an active disc.

Example 3

Example 3 is prepared in the same manner as in Example 1 except that MABS resin having a polybutadiene latex with an average rubber particle size of 140 nm is used as a dummy disc and polycarbonate (product name: Makrolon CD2005 manufactured by Bayer AG) is used as an active disc.

Example 4

Example 4 is prepared in the same manner as in Example 1 except that MABS resin having a polybutadiene latex with an average rubber particle size of 300 nm is used as a dummy disc and polycarbonate (product name: Makrolon CD2005 manufactured by Bayer AG) is used as an active disc.

Example 5

50% by weight (solid content) of butadiene-styrene copolymer rubber latex (styrene contents: 25 wt %) having an average rubber particle size of 200 nm, 26.1% by weight of methylmethacrylate, 2.5% by weight of acrylonitrile, and 21.4% by weight of styrene are emulsion polymerized in the presence of emulsifier, initiator, molecular weight modifier, and ion-exchanged water. The resultant product is coagulated, dehydrated and dried to obtain graft MABS powder having a water content of less than 1 wt %.

To a separate reactor, 52.2% by weight of methylmethacrylate, 5% by weight of acrylonitrile, and 42.8% by weight of styrene are added and suspension polymerized in the presence of initiator, organic dispersing agent, dispersion aid, molecular weight modifier, and ion-exchanged water. The resultant product is dehydrated and dried to obtain methylmethacrylate-acrylonitrile-styrene copolymer resin (MSAN) with a weight average molecular weight of about 105,000 in bead form.

To 100 parts by weight of a resin mixture of 34% by weight of the graft MABS powder and 66% by weight of the MSAN thus produced respectively, 0.3 parts by weight of Irganox 1076 (Ciba) as an antioxidant, 0.2 parts by weight of ethylenebis stearamide as a lubricant, and 0.3 parts by weight of a magnesium stearate as a stabilizer are added and mixed. The mixture is extruded to prepare a product in pellet form. The resin pellets are molded into test specimens for measuring physical properties and a 0.6 mm thick dummy disc. The components present in the methacrylate-acrylonitrile-butadiene-styrene copolymer (MABS) resin are 43.3% by weight of methylmethacrylate, 4.2% by weight of acrylonitrile, 17% by weight of butadiene-styrene copolymer rubber, and 35.5% by weight of styrene.

Next, the same procedure as in Example 1 is repeated except that MABS resin obtained as described above was used as a dummy disc and polycarbonate (product name: Makrolon CD2005 manufactured by Bayer AG) is used as an active disc.

Comparative Example 1

Comparative Example 1 is prepared in the same manner as in Example 1 except that polycarbonate (product name: Makrolon CD2005 manufactured by Bayer AG) is used as a dummy disc and polycarbonate (product name: Makrolon CD2005 manufactured by Bayer AG) is used as an active disc.

Comparative Example 2

Comparative Example 2 is prepared in the same manner as in Example 1 except that polymethylmethacrylate resin (product name: IF-850 manufactured by LG Chemical Co.) is used as a dummy disc and polycarbonate (product name: Makrolon CD2005 manufactured by Bayer AG) is used as an active disc.

Comparative Example 3

Comparative Example 3 is prepared in the same manner as in Example 1 except that acrylonitrile-butadiene-styrene copolymer resin (ABS: BASF GP-35) having an average rubber particle size of 300 nm is used as a dummy disc and polycarbonate (product name: Makrolon CD2005 manufactured by Bayer AG) is used as an active disc.

Comparative Example 4

Comparative Example 4 is prepared in the same manner as in Example 1 except that polymethylmethacrylate resin (product name: IF-850 manufactured by LG Chemical Co.) is used as both a dummy disc and an active disc.

Comparative Example 5

Comparative Example 5 is prepared in the same manner as in Example 1 except that acrylonitrile-butadiene-styrene copolymer resin (ABS: BASF GP-35) having an average rubber particle size of 300 nm is used as a dummy disc and polymethylmethacrylate resin (product name: IF-850 manufactured by LG Chemical Co.) is used as an active disc.

The physical properties of the test specimens and dummy discs of Examples and Comparative Examples are measured as follows, and the results are shown in table 1.

(1) Injection Moldability of the dummy disc: Flowability is measured in accordance with ISO 1103 at 220° C. under a 10 kg load (g/10 min).

(2) UV curability: UV curability is evaluated by using a test specimen having 125 mm length, 13 mm width, and 2.2 mm thickness. UV adhesive is applied to the area of 10 mm×13 mm of the test specimen. The test specimen is subjected to irradiation of ultraviolet ray having a wavelength of 365 nm and an intensity of 100 mW/cm² for 20 seconds and the tensile strength is measured in accordance with ASTM D 638 to evaluate UV curability. Loctite® 3100 adhesive is used as the UV adhesive.

(3) Falling Dart Impact of dummy disc: A test piece having a thickness of 3.2 mm is fixed on a cylinder of which inside diameter is 50 mm. A ball having a diameter of 1.5 mm and a weight of 10 kg is dropped, such that energy onto the test piece is 70 J. The test is conducted repeatedly for 5 test pieces and an average value is calculated.

(4) Bending Test: The bending property is evaluated in accordance with DVD MIDI measurement of Sony Electronics. Inc. of Japan as to an optical disc in which a dummy disc and an active disc are bonded to each other. The optical disc is subjected to a 90° bending. When no crack is observed at the bent portion, the optical disc is evaluated to be good.

(5) Tensile Elongation: The percentage of the increase in length compared with the original length is measured in accordance with ASTM D638 with a drawing speed of 5 mm/min.

(6) Notch Izod Impact Strength of MABS: The impact strength is measured in accordance with ASTM D-256 (kgf·cm/cm).

(7) Light Transmissivity of MABS: The light transmissivity of the MABS is evaluated as total light transmittance and haze using a color computer manufactured by SUGA INSTRUMENT Co., Ltd. of Japan. The haze is calculated from the following formula: HAZE (%)=(diffused light transmittance/total light transmittance)×100. The total light transmittance (%) is calculated from the following formula: total light transmittance (%)=(light transmitted at all forward angles/incident light)×100

TABLE 1

|  | Example | | | | | Comparative example | | | | |
| --- | --- | --- | --- | --- | --- | --- | --- | --- | --- | --- |
|  | 1 | 2 | 3 | 4 | 5 | 1 | 2 | 3 | 4 | 5 |
| Active disc | PC | PMMA | PC | PC | PC | PC | PC | PC | PMMA | PMMA |
| Dummy disc | MABS | MABS | MABS | MABS | MABS | PC | PMMA | ABS | PMMA | ABS |
| Injection Moldability of Dummy Disc | ○ (21) | ○ (21) | ○ (21) | □ (17) | ○ (23) | x (6) | x (4) | □ (29) | x (4) | □ (29) |
| Diameter of Rubber Particle (nm) | 200 | 140 | 140 | 300 | 200 | — | — | 300 | — | 300 |
| UV Curability (Tensile Strength, Kgf/cm²) | OK (430) | OK (352) | OK (435) | OK (376) | OK (428) | OK (458) | OK (358) | FAIL (135) | OK (338) | FAIL (158) |
| Falling Dart Impact Strength on Dummy Disc (J) | 24 | 14 | 20 | 18 | 20 | 35 | 2 | 35 | 2 | 35 |
| Bending property | PASS | PASS | PASS | PASS | PASS | PASS | FAIL | — | FAIL | — |
| Tensile elongation (%) | 52 | 48 | 55 | 35 | 40 | 75 | 5 | 25 | 5 | 25 |
| MABS HAZE | 2.0 | 1.6 | 1.6 | 2.6 | 2.3 | — | — | — | — | — |
| Light transmissivity | 91 | 91 | 91 | 90 | 91 | — | — | — | — | — |
| Impact strength | 20 | 13 | 13 | 23 | 17 | — | — | — | — | — |

As shown in Table 1, Comparative Example 1 employing PC (polycarbonate) resin as a dummy disc shows decreased injection moldability. Comparative Example 2 employing PMMA resin as a dummy disc shows UV curability but the falling Dart impact strength of the dummy disc and other properties deteriorated significantly. Comparative Examples 3 and 5 in which ABS resin is used for a dummy disc show that UV curability degraded. In contrast, Examples 1 to 5 in which MABS resin is used for a dummy disc show good injection moldability, flowability, UV curability, as well as high impact strength, and bending property.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. An optical disc comprising:
    an active disc on which information is recorded; and
    a dummy disc for protecting the active disc,
    wherein the active disc and the dummy disc are bonded to form a single body, and wherein the dummy disc comprises methylmethacrylate-acrylonitrile-butadiene-styrene copolymer (MABS) resin, wherein the methylmethacrylate-acrylonitrile-butadiene-styrene copolymer (MABS) resin comprises about 36 to about 47% by weight of methylmethacrylate, about 4 to about 7% by weight of acrylonitrile, about 10 to about 30% by weight of butadiene-styrene copolymer rubber, and about 30 to about 36% by weight of styrene.

2. The optical disc of claim 1, wherein said methyl-methacrylate-acrylonitrile-butadiene-styrene copolymer (MABS) resin comprises a rubber component having an average particle size of about 100 to about 350 nm.

3. The optical disc of claim 1, further comprising:
a recording surface formed on the active disc, and
a reflective layer deposited onto the recording surface, wherein the dummy disc is bonded to the reflective layer.

4. The optical disc of claim 3, wherein said dummy disc is bonded via an ultraviolet ray curing resin.

5. The optical disc of claim 1, wherein the active disc has an inner surface facing the dummy disc including a plurality of grooves and wherein the dummy disc has a smooth inner surface facing the active disc.

6. The optical disc of claim 4, wherein the ultraviolet ray curing resin is between the dummy disc and the reflective layer.

7. The optical disc of claim 6, wherein the active disc has an inner surface facing the dummy disc including a plurality of grooves and wherein the dummy disc has a smooth inner surface facing the active disc.

* * * * *